United States Patent [19]

Lawniczak

[11] Patent Number: 5,438,435

[45] Date of Patent: Aug. 1, 1995

[54] DUPLEX DOCUMENT HANDLER AND IMAGE FORMING APPARATUS

[75] Inventor: Gary P. Lawniczak, Rochester, N.Y.

[73] Assignee: Eastman Kodak Company, Rochester, N.Y.

[21] Appl. No.: 98,111

[22] Filed: Jul. 27, 1993

[51] Int. Cl.$^6$ .............................................. H04N 1/04
[52] U.S. Cl. ................................. 358/496; 358/498; 358/449; 358/474; 358/401; 355/320; 355/308; 355/309; 355/311; 355/318
[58] Field of Search ............... 358/496, 498, 401, 501, 358/449, 488, 482; 355/311, 318, 319, 320, 321, 308, 309, 50, 235; 271/186

[56] References Cited

U.S. PATENT DOCUMENTS

| | | | |
|---|---|---|---|
| 4,140,387 | 2/1979 | Gustafson | 355/14 |
| 4,699,365 | 10/1987 | Smith et al. | 271/3.1 |
| 4,712,906 | 12/1987 | Bothner | 355/3 TR |
| 4,737,820 | 4/1988 | Murray | 355/14 SH |
| 4,839,740 | 6/1989 | Yoshida | 358/498 |
| 4,884,097 | 11/1989 | Giannetti et al. | 355/23 |
| 4,979,727 | 12/1990 | Koike et al. | 355/318 |
| 5,027,162 | 6/1991 | Kida et al. | 355/320 |
| 5,119,145 | 6/1992 | Honjo et al. | 355/311 |
| 5,125,636 | 6/1992 | Higashio et al. | 355/311 |
| 5,157,521 | 10/1992 | Chung | 358/496 |
| 5,239,395 | 8/1993 | Kang et al. | 358/496 |

FOREIGN PATENT DOCUMENTS 4018123 12/1990 Germany ........................ H04N 1/31

OTHER PUBLICATIONS

Patent Abstracts of Japan, vol. 7, No. 123 (E-178) (1268) 27 May 1983 & JP-A-58 040 971 (Fuji Xerox) 10 Mar. 1983 (Abstract).

Primary Examiner—Edward L. Coles, Sr.
Assistant Examiner—Fan Lee
Attorney, Agent, or Firm—Leonard N. Treash, Jr.

[57] ABSTRACT

A duplex document handler feeds document sheets from a document sheet supply to a stationary exposure position through which the document sheets are moved for scanning by a linear CCD array. Duplex document sheets are fed from the exposure station into a loop, leading edge first, and returned, still leading edge first, to the exposure for exposure of the opposite side of the sheet. The document sheets are moved in opposite directions through the exposure station for exposure of the two sides. The loop is the size to receive either one large, for example, ledger sized document, or two smaller, for example, letter or legal sized document sheets, before receipt of further document sheets.

15 Claims, 4 Drawing Sheets

DUPLEX DOCUMENT HANDLER AND IMAGE FORMING APPARATUS

This invention relates to a duplex document handler particularly usable as part of a document scanner. It also relates to an image forming apparatus which includes a scanner having a duplex document handler.

U.S. Pat. No. 4,884,097 to Giannetti et al, issued Nov. 28, 1989, shows a duplex document handler in which a stack of original document sheets is positioned face-down in a supply tray to one side of a scanning position. Duplex sheets are fed off the bottom of the stack past an exposure station which is backed by a turnover drum. As one side is being exposed, the sheet is moved around the turnover drum and into an inverting path to a reversing location generally above the supply tray. As the trailing edge of the sheet moves past the turnover drum into the reversing location, the trailing edge is sensed and the movement of the sheet reversed to bring the opposite side of the sheet past the exposure station. The turnover drum then moves the sheet back through the reversing location and into a duplex exit tray positioned generally above the supply tray. Simplex documents are fed off the bottom of the stack, past the exposure station and into a simplex exit tray positioned opposite the supply tray from the exposure station.

This particular document handler is presently used commercially as part of an electronic scanner. The scanner, in turn, is part of an electronic copier which produces copies of the original from an electronic signal created by the scanner. The duplex document handler shown in the Giannetti et al patent has been commercially successful, scanning simplex documents at a speed of 70 images per minute. This invention is an improvement in this apparatus. The Giannetti et al patent is hereby incorporated by reference herein.

U.S. Pat. No. 4,712,906, granted to Bothner et al Dec. 15, 1987, shows a color image forming apparatus, usable with the Giannetti duplex document handler, with a transfer device that transfers letter sized color images in pairs and ledger sized color images one at a time.

U.S. Pat. No. 4,140,387, granted Feb. 20, 1979 to Gustafson, shows a duplex recirculating document feeder for an optical copier. A stack of duplex original sheets are fed one after another from the bottom through a single inversion to an exposure platen where they are stopped for exposure. The sheets are then fed through an inverting path which includes a change in direction of the sheets and back to the platen where the sheet is, again, stopped for exposure of the opposite side. The sheet is returned to the top of the stack for recirculation through an appropriate number of inversions to provide collated output. Although the primary order of imaging with this handler is intended to be sequential, for example, 6, 5, 4, 3, 2 and 1, the specification suggests that a second sheet can be exposed while the first is being turned over. With this embodiment, the page order would be not exactly sequential. For example, it could be 6, 4, 5, 3, 2, 1. In the Gustafson apparatus this order of imaging would require comparable adjustment of copy sheet presentation to the copier.

U.S. Pat. No. 4,699,365, granted to Smith et al Oct. 13, 1987, and U.S. Pat. No. 4,737,820, granted to Murray, Apr. 12, 1988, show a recirculating feeder, also used commercially with an optical copier, in which a bottom sheet of a stack is fed through a single inversion to an exposure platen, exposed, and then inverted by feeding through a loop which brings the same leading edge back to the exposure platen but with the reverse side of the sheet in the exposure position. The use of a loop inverter rather than a sheet reversing inverter increases the speed of the feeder and makes the feeder somewhat more compact. Like Gustafson, this feeder is used with an optical copier in which an entire image is exposed with a single flash.

SUMMARY OF THE INVENTION

Because of both speed and simplicity, it is desirable to use a loop similar to that disclosed in the Smith and Murray patents, rather than a sheet reversing approach to sheet inversion. However, the loop is particularly suited for flash optical exposure since, with flash exposure, the path and direction of movement of the sheet does not affect exposure as it does with an optical or electronic scanning system. Problems associated with movement of the sheet in a loop teach away from its use in a scanner.

It is an object of the invention to provide a duplex document handler for a scanner, especially a scanner usable with an electronic copier, which handler eliminates or obviates at least some of the above problems.

It is also an object of the invention to provide a scanner including such a duplex document handler.

It is also an object of the invention to provide an electronic copier including such a scanner.

These and other objects are accomplished by a duplex document handler for moving each side of a document sheet through a stationary exposure or scanning station. The handler includes supply means for receiving at least one document sheet, means for feeding the document sheet from the supply means along a supply path through the scanning station with a first side of the document sheet facing in a scanning orientation, means for feeding the document sheet, leading edge first, from the scanning station through a loop bringing the same leading edge of the document sheet back to the scanning station with a second opposite side of the document sheet facing in the scanning orientation and for moving the document sheet in a second direction opposite the first direction through the scanning station to expose the second side of the sheet, and means for electronically scanning whichever side of a document sheet is facing in the scanning orientation as the document sheet moves through the scanning station.

With this invention the document handler uses a loop turnaround with the same edge of the sheet entering the exposure or scanning station for scanning each side of the sheet with the advantages in speed and simplicity attendant with loops compared with reversing turnarounds. Using an electronic scanning device to scan the original, the image can be utilized despite the fact that respective images on the opposite sides of a document sheet are scanned in opposite directions. Thus, although using a loop provides an electronic signal in which the information from one side of a document is in a reverse orientation to that from the other side of the document, copying can still be done either simplex or duplex with a conventional electronic marking engine.

Unlike a flash exposure device, overlap of the leading and trailing portions of a sheet in the scanning station is undesirable. Thus, according to a preferred embodiment of the invention, the size of the loop is made equal to the size of a large sized original, for example, a ledger sized original. When the smaller sized originals, for example, letter sized originals, are to be scanned, two smaller sized originals are fed into the loop at a single time. This permits the structure to provide full speed scanning for both larger and smaller sized original copy sheets without changing the size of the loop or providing different loops for the two sizes. The scanning is then in a nonsequential order for the smaller sized original sheets, for example, in page order such as 1, 3, 2, 4, 5, 7, 6, 8 when doing letter sized sheets. Again, suitable electronics stores the images in a manner allowing ready retrieval for copying with any conventional electronic marking engine.

Thus, with the preferred embodiment, an inverting duplex loop with its speed and simplicity is used in an electronic scanner capable of handling both large and small size document sheets.

DESCRIPTION OF THE PREFERRED EMBODIMENTS

This invention relates to a duplex document handler for presenting document sheets to a stationary scanning or exposure station as part of an electronic scanner. It is particularly adapted for use with a high speed duplex electronic copier. However, it can also be used with stand alone scanners or scanners which form part of other types of image forming apparatus.

Figure 1:
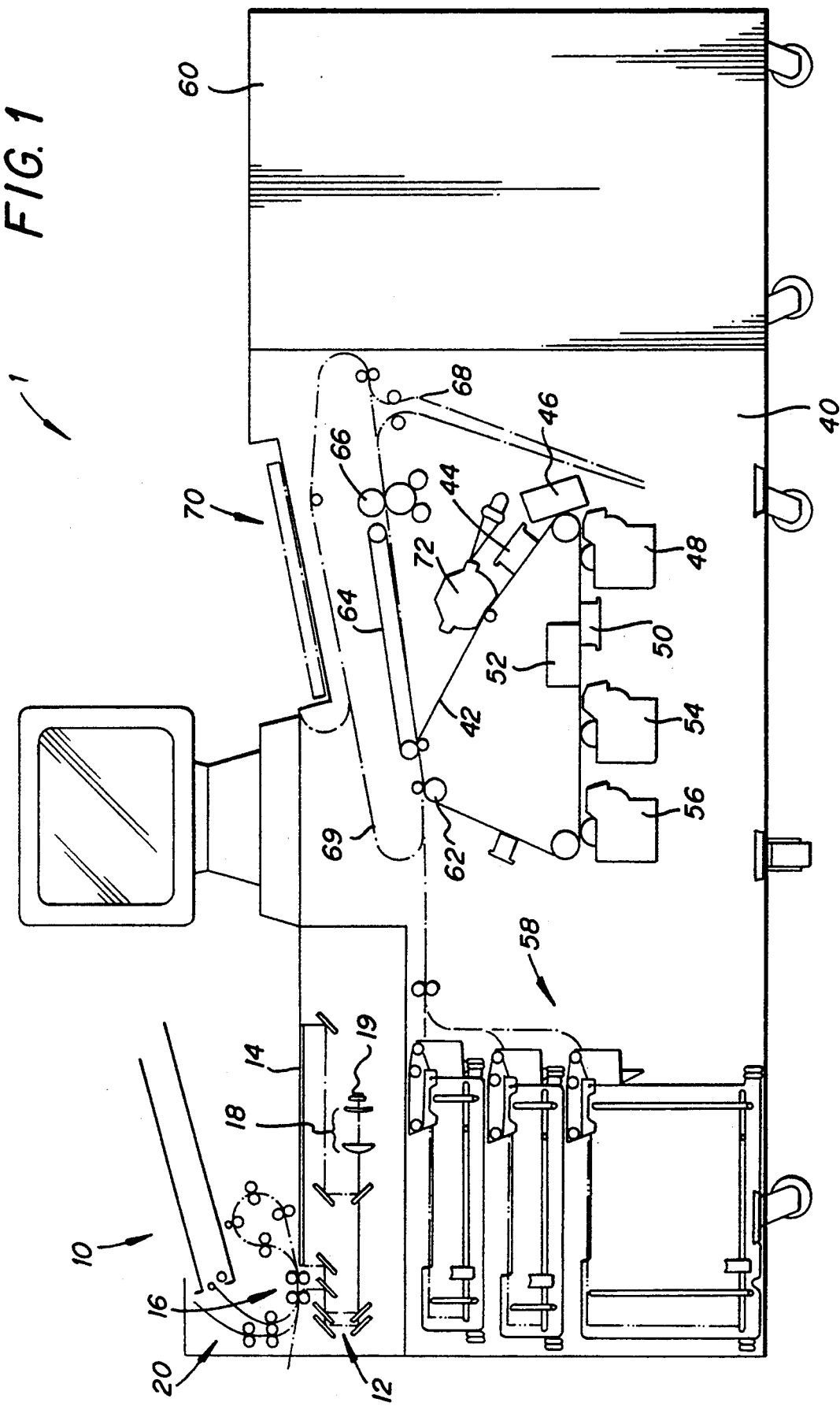
FIG. 1 is a front schematic of an image forming apparatus.

Referring to FIG. 1, an image forming apparatus 1 includes a scanner 10 and a marking engine 40. It may also include accessories 60 such as a sorter, stapler or the like.

Although other basic technology could be used, marking engine 40 is shown as a conventional electronic electrophotographic marking engine in which an electronic signal is converted electrophotographically into hardcopy output. Other approaches such as inkjet, thermal, or the like, can be used to convert the electronic signal into an appropriate copy. The image forming apparatus may also operate as a multifunctional device in which marking engine 40 can produce hardcopy output in response to a signal both from a scanner (when in a copying mode) and from a computer or FAX (when in a printing mode).

Marking engine 40 includes an image member, for example, a photoconductive belt 42, which is trained around a series of rollers to be moved through a series of electrophotographic stations well known in the art. In operation, image member 42 is first uniformly charged by a primary charger 44 and imagewise exposed at an exposing station, for example a first LED printhead 46 to create a first electrostatic image on the image member. The electrostatic image is toned by the application of a first toner from a first development station 48.

If a two color image is desired, the image member is, again, uniformly charged by a secondary charger 50 and imagewise exposed by a second LED printhead 52 which can expose the image member through its base, providing that base is transparent, to form a second electrostatic image, generally in the same area containing the first toner image. The second electrostatic image is toned by one of two toning stations 54 or 56 which, preferably, contain different color toners providing a choice of accent color for the copy. Ordinarily, station 48 would contain black toner. If only a black image is desired, obviously, stations 50-56 would be skipped.

The one or two color image proceeds to a roller transfer station 62. At the same time, a receiving sheet is fed from a receiving sheet supply 58 also to transfer station 62 where the toner image or images are transferred to the receiving sheet electrostatically. The receiving sheet separates from image member 42 and is transported by a receiving sheet transport 64 to a fuser 66 where the toner image is fixed to the receiving sheet. The receiving sheet can then proceed to accessory 60 where it can be sorted, stapled, bound or otherwise finished.

Alteratively, the receiving sheet can go through a turnover 68 and be fed through a recirculating path 69 back to transfer station 62 to receive a one or two color image on the opposite side of the receiving sheet to form a duplex copy. A simplex or duplex copy may also be fed into an output hopper 70 where it is stacked, preferably in collated form, for access by the operator. Whether the receiving sheets are stacked faceup or facedown in output hopper 70 depends on the order the images are made. For example, to stack them faceup in the output hopper requires that images be formed beginning with at least the last sheet first. For various reasons, this may not be the most desirable order for imaging. Thus, if images are formed beginning with the first sheet, for example, image page 1 (page 1 or 2 in duplex operation), then the sheets in output hopper 70 would be stacked facedown.

Many orders of imaging are known in the art when doing duplex reproduction using a finite sized return path such as recirculating path 69. For example, if the recirculating path 69 is six letter sized sheets long, letter sized images may be formed in a page number order of 1, ,3, ,5, ,2, 7, 4, 9, 6, 11, etc. Many other algorithms have been suggested in the art and have been applied in practice which have different advantages for different size recirculating paths or information handling schemes. If the entire job is contained in memory or, if the original scanning is done from the highest page to the lowest page number, the job can be programmed from the highest page number sheet first and the output sheets stacked with the first sheet facing up in a typical output hopper 70.

Scanner 10 includes an optical system 12 and a duplex document handler 20. Optical system 12 includes a set of mirrors which can be movable to scan a stationary document placed on a platen 14 or stationary to scan a moving document sheet at a scanning or exposure station 16. A lens 18 presents a moving image to a linear light sensitive array such as a linear charge coupled device 19. This general approach of moving mirrors to scan a stationary object at a platen, or keeping the mirror stationary to scan moving document sheets at a stationary scanning station, is well known in the art. See, for example, Giannetti et al patent referred to above which has been incorporated by reference herein.

Figure 2:
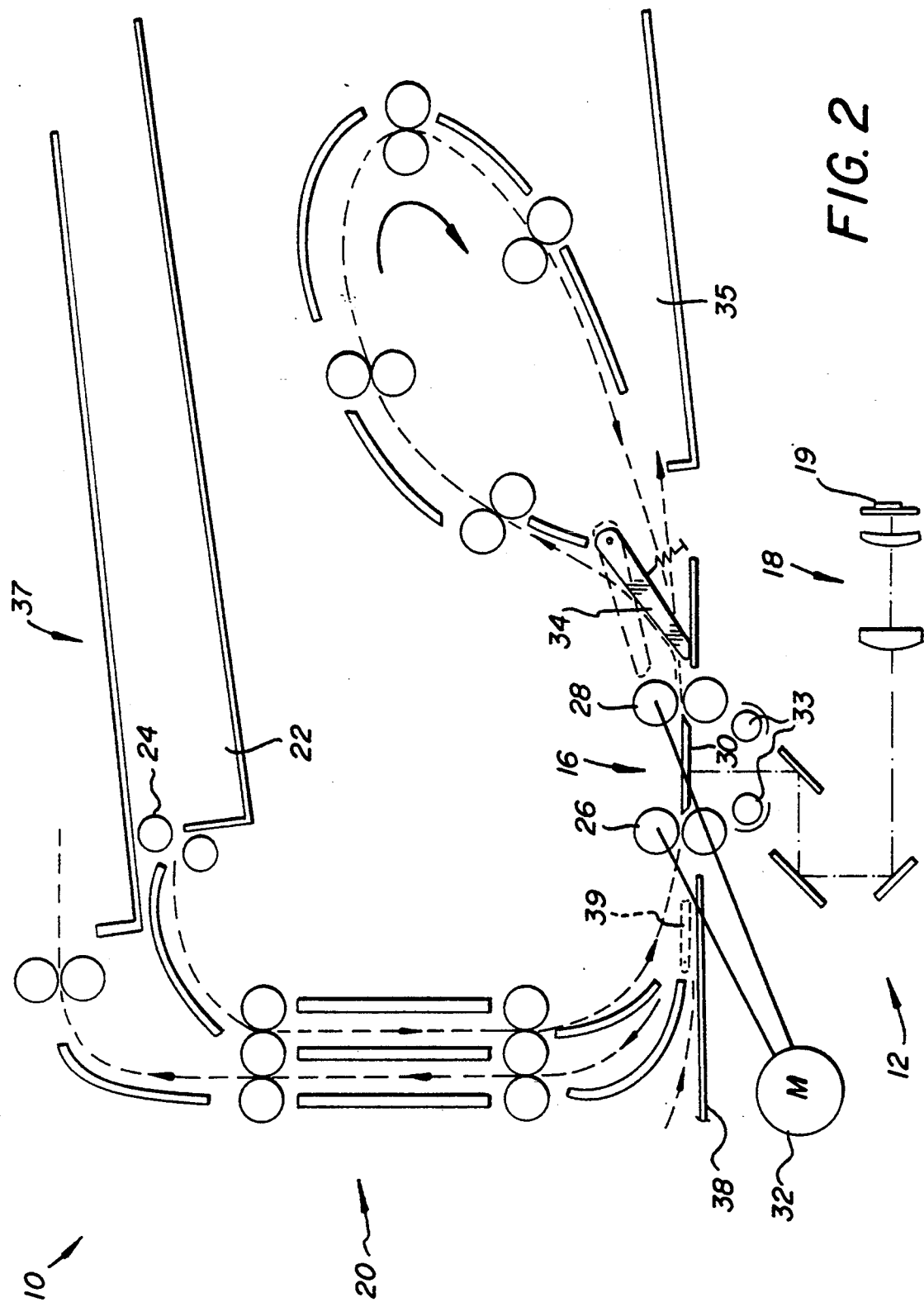
FIG. 2 is a front schematic of a scanner including a duplex document handler.

Referring to FIG. 2, duplex document handler 20 includes an input or supply tray 22 positioned generally above scanning station 16 for receipt of a stack of original document sheets faceup. A top sheet separating device 24 separates the top sheet from the stack and feeds it to a series of transport rollers which move it through an inverting path to two pairs of scanning drive rollers 26 and 28 which are located on opposite sides of the scanning station 16. The actual scanning location is defined, preferably, by a transparent plate 30. Scanning roller pairs 26 and 28 are driven by a reversible drive motor 32 to feed both simplex and duplex sheets across transparent plate 30 where they are illuminated by suitable illumination system 33 and scanned through stationary optical system 12 by CCD 19.

If the document sheet presented to scanning station 16 is simplex, it is fed past a deflector 34 and into a simplex output tray 35 facedown. If the document sheet is duplex, it is deflected by deflector 34 into a duplex loop 36. Loop 36 returns the sheet to scanning station 16 with the same leading edge first as during the first pass, but with the opposite side of the sheet facing the scanning orientation (downward as shown in FIG. 2). Scanning rollers 26 and 28 are now driven in their reverse directions to feed the sheet across the scanning station 16 in a direction opposite to that for the first pass and the sheet is returned through an inverting path by a set of transport rollers to a duplex output tray 37 located generally above the input supply tray 22.

An alternate straight through path for individual sheets that are not convenient to feed from tray 22 is defined, in part, by a guide 38 and passive diverter 39. Such sheets are fed by scanning rollers 26 and 28 directly across scanning station 16 and into simplex output tray 35.

In the FIG. 2 and other embodiments shown hereafter, loop 36 is defined by a series of curved guides and sets of transport rollers. It can also be defined by other mechanisms which feed the sheet through an inverting path maintaining the same leading edge. For example, a roller or drum can be used to define the entire path as shown in the Smith et al patent, referred to above. The Smith et al patent is hereby incorporated by reference herein.

Whatever the actual path defining means, the loop presents at least two problems. Because the document sheet is being continuously scanned while it moves, the leading edge of the sheet cannot enter the scanning position before the trailing edge has left. Thus, the loop must be large enough to accommodate the largest size sheet to be scanned. One solution to this problem is to make the loop size adjustable or to provide different loops for different size sheets. However, a preferred approach is shown in FIG. 2 in which the loop is made a size large enough to accommodate the largest size sheet, for example, when ledger sized sheets are scanned across their longer dimension. When substantially smaller sized sheets are being scanned, for example, when letter sized sheets are being scanned across their shortest dimension, more than one sheet is fed into the loop at a time.

Thus, if simplex sheets are in tray 22, then the document handler 20 feeds them one after another regardless of size past the scanning station 16 and into simplex output tray 35. If duplex ledger sized sheets are positioned in tray 22, they are fed from tray 22 intermittently. That is, they are fed with a one sheet gap between sheets. This permits each sheet to be turned around and scanned on the opposite side before the next sheet arrives and rollers 26 and 28 are reversed.

However, when a stack of letter sized or legal sized duplex original document sheets is positioned in tray 22 with their short dimension in an intrack orientation, the sheets are fed in pairs. That is, the top two sheets are fed one after another, then leaving a gap generally at least as large as the intrack dimension of two such sheets and then two more sheets are fed, etc. The two sheets are each scanned on one side, turned over in loop 36 and then scanned on the other side and fed into duplex output tray 37 as the next pair of sheets arrives at scanning station 16. This operation is controlled by a logic and control whose function will be explained with respect to FIG. 8. However, it is desirable that the logic and control have an input indicating the size of the original document sheets in the intrack direction so that the desired program of feeds and skip feeds can be programmed. This input can be effected at an operator control panel by the operator. Alteratively, the size of the sheets can be sensed in the input path or the supply tray 22 using conventional sensing equipment well known in the art and presently available on many image forming apparatus.

An alterative approach is to use the scanning done by CCD 19 to determine the intrack dimension of the sheets being fed. This requires a somewhat later control in the feed path for the sheets. For example, if each sheet is fed from supply 22 but stopped at a position just before the scanning station 16, feeding from that position can be effected in response to document size determination done through CCD 19. In the embodiment shown in FIG. 2, the size of the documents is either input by the operator or automatically sensed in the supply tray.

Note, also, that in the duplex small sheet mode the order of scanning will be different than it is for the ledger sized sheets. That is, feeding from the top, scanning will be in a 1, 3, 2, 4, 5, 7, 6, 8, etc. order. Using a suitable buffer, the marking engine 40 has no difficulty in forming images in either simplex or duplex from such scanning, in any order desired. As described above, doing duplex output may require also a substantially different order of image formation. For example, using the duplex return path log shown in FIG. 1, requires a nonsequential order. The same is true of two pass marking engines using an intermediate tray. Reordering image formation from an image buffer is well known in the art.

Note, also, that the smaller sheets need not be exactly one half the intrack dimension of the larger sheet. They only have to be small enough relative the loop intrack dimension not to cause an overlap in the scanning station.

A second problem associated with employing a loop such as loop 36 is that the scan direction for the second side of a document sheet is reversed from that of the first side. That is, if a letter sized sheet is scanned with its short dimension in the intrack direction, it will be scanned first from right to left. The same sheet, when it is returned, will be scanned from left to right. If the scan were being projected onto a moving image member, as is common in many copiers, this problem would require a quite expensive optical system to solve. However, because each side is being scanned by CCD 19 and fed to a suitable buffer, the problem can be handled in a variety of electronic ways well known in the art. That is, the second image can be fed into a buffer or memory in a reverse orientation from the way the first image is fed in. Alteratively, the two images can be fed into the buffer in orders scanned, but the second image read out from the opposite end of the image information as the first is read out.

FIG. 2 illustrates other advantageous features of duplex document handler 20. The document sheets are separated from the top of the stack in input or supply tray 22. This makes separation considerably simpler and allows for separation of a larger variety of sheets and, generally, with less damage to the sheets themselves than would conventional bottom separation.

Figure 3:
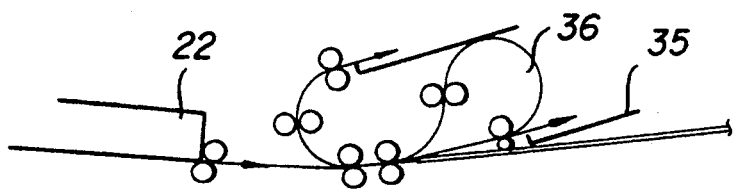
FIGS. 3-7 are front schematics of alterative duplex document handlers.
Figure 4:
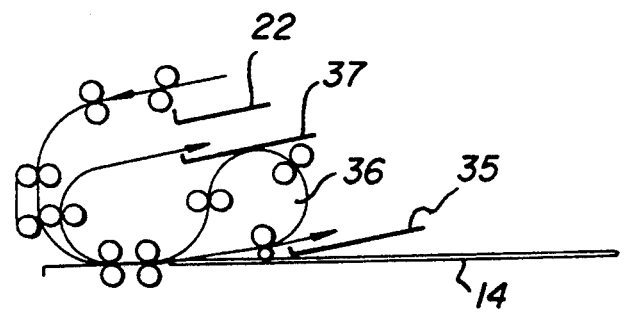

FIGS. 3-8 show alterative embodiments of document handlers using duplex loops in which the invention can be used. Referring to FIG. 3, the input or supply tray 22 is positioned to the side of the handler and feeding is off the bottom, as is commonly used in much of the prior art. This has the disadvantage of requiring bottom separation from the stack but the advantage of eliminating an inverting feed path. FIG. 4 shows a structure very similar to that of FIG. 2 but in which the supply tray 22 and the duplex output tray 37 have exchanged positions.

Figure 5:
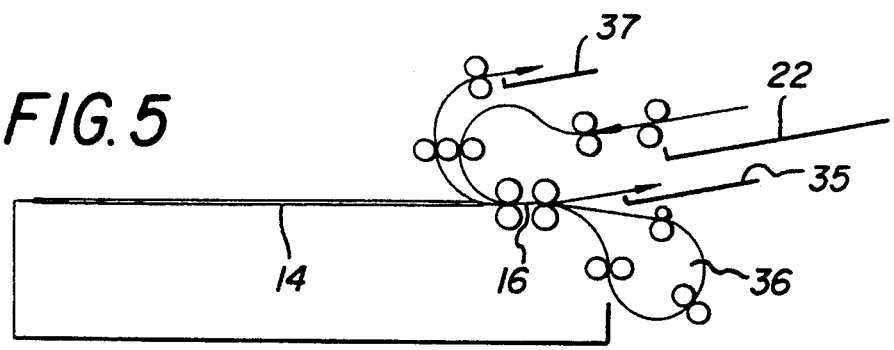

FIG. 5 is similar to FIG. 2 except that the loop 36 is positioned below the simplex output tray with the platen 14 being on the input side of the scanning station 16. This design requires space in the machine below the scanning station for the loop 36.

Figure 6:
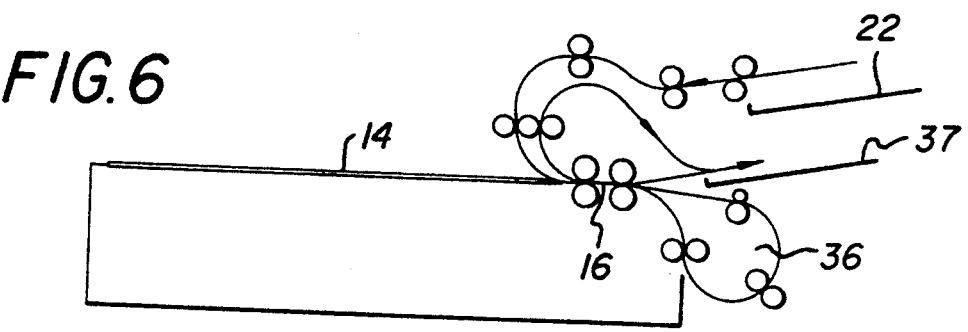
Figure 7:
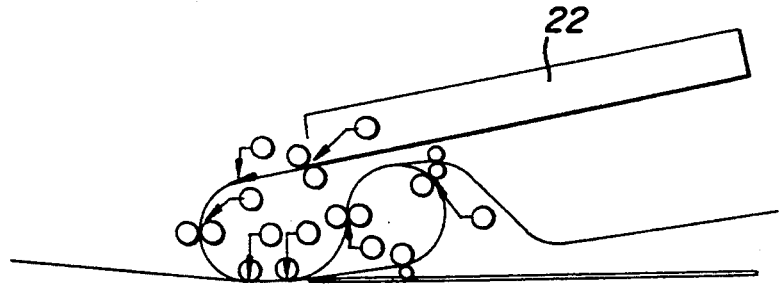

FIG. 6 is a variation of the approach shown in FIG. 5 but in which all output goes into the same output tray 37. This is facilitated by putting the input tray 22 on top and by having the loop 36 below the common output tray 37. The platen 14 is, again, to the input side of the scanning station 16. FIG. 7 shows the input tray generally above the scanning station 16 but with feeding off the bottom from a faceup document stack. This approach also uses a single output tray.

Figure 8:
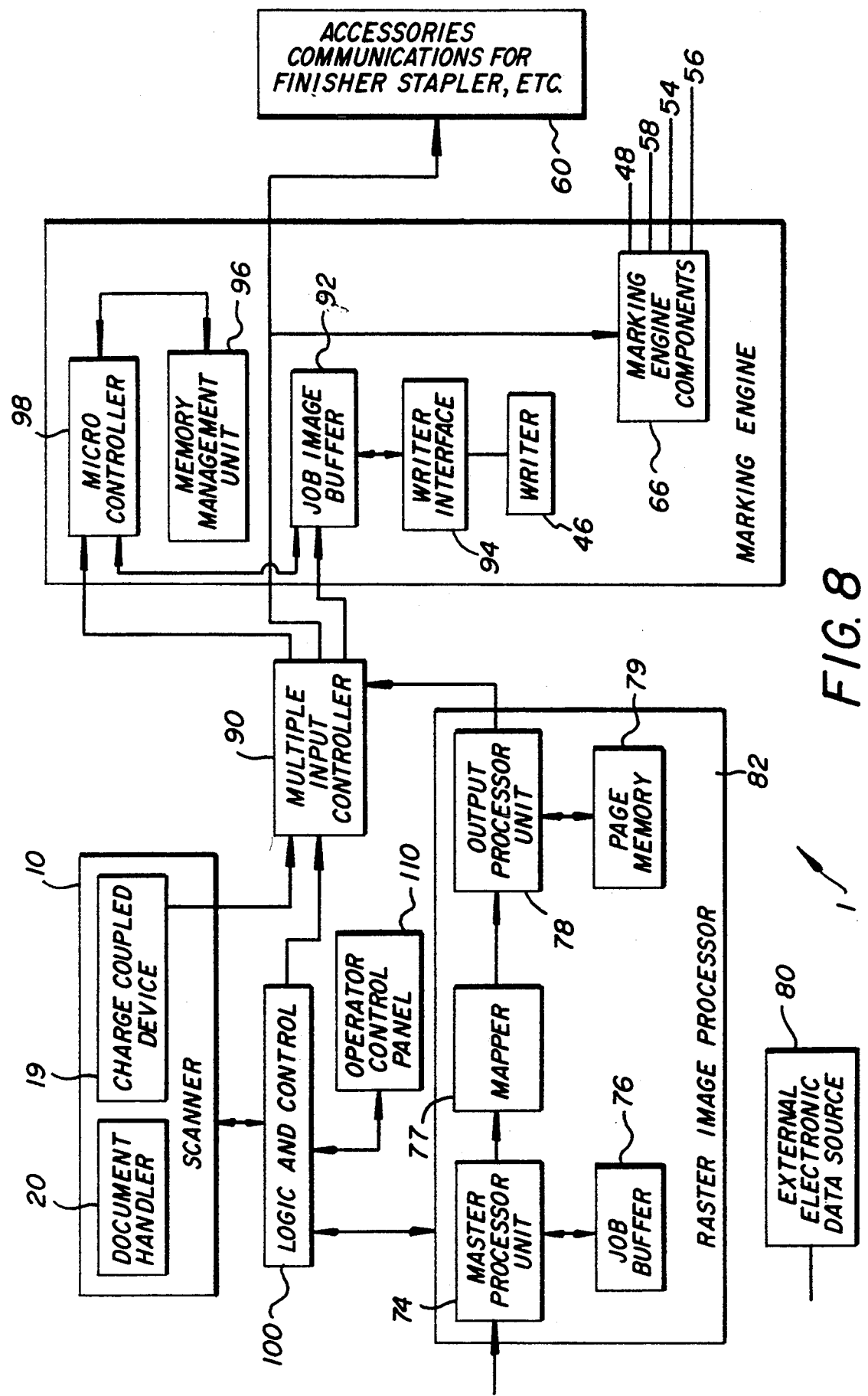
FIG. 8 is a schematic block diagram of the image forming apparatus.

FIG. 8 is an electrical block diagram of image forming apparatus 1. Image forming apparatus 1 is a multifunctional device that can work from more than one image source. That is, an electronic signal representing the image, which is used by marking engine 40 to make prints or copies, can originate in scanner 10 or from an external electronic data source 80. It would feed image data in character code form into a raster image processor 82. Raster image processor 82 uses traditional components, described later, to supply an electronic signal in bitmap form to a multiple input controller 90 which, in turn, feeds the signal to the marking engine 40 for printing.

Alteratively, scanner 10, which includes document handler 20 and CCD 19, also provides an electronic signal in the form of a bitmap to multiple input controller 90 for presentation to marking engine 40. A logic and control 100, working with an operator control panel 110, controls both the operation of the scanner 10 and the raster image processor 82 and whatever queuing is necessary with multiple input controller 90.

Setup instructions for use with the scanner 20 are input by the operator using the operator control panel 110 to the scanner and the marking engine, while information for finishing and processing of jobs is sent to the accessory 60, as well as the marking engine 40. The logic package consists of control software, interface software and logic hardware. Functions that can be input by the operator at the operator control panel can include inputs indicative of the size of the originals. Alteratively, that information could be fed to logic and control from appropriate sensors in the document handler 10. Logic and control then controls the feeding of document sheets within the document handler according to the appropriate inputs received from either the operator control panel or the input tray sensors.

The image signal created by CCD 19 is shown in FIG. 8 as being fed directly into multiple input controller 90 and, hence, into job interface buffer 92 as controlled by logic and control 100. This input includes synchronization signals to identify separate scan lines and to provide page information and marking engine control. Marking engine 40 receives the bit stream image data and job control data from multiple input controller 90 for storage in a job image buffer 92 under control of a memory management unit 96. Control means, including a microcontroller 98, is arranged to perform arithmetic and logic operations and instruction decoding, as well as controlling the time allocation of peripherals such as a paper supply controller, not shown, and accessories 60. Output functions may be available for receiver sheets, including selection of output trays, stapling, sorting, folding, finishing, mailbox, envelope receiver, etc.

After appropriate processing, the data is input to a writer interface 94 and a writer, for example, LED printhead 46, for forming images on the receiver sheets. A separate writer interface, not shown, is also connected to job image buffer 92 for controlling writer 52 (FIG. 1).

Raster image processor 82 includes a master processor unit 74 which receives high level commands and data in character code from a mainframe computer, network link, data processing work station, removable memory media, FAX, or the like. The commands are translatable into machine control language by the master processing unit. A job buffer 76 stores incoming jobs and program codes for use by the master processing unit.

After interpreting a job, master processor unit 74 parcels the job to a mapper 77 which converts the character code data to a pixel pattern map. For color prints, the mapper separates the information into two raster patterns, one for each color available at marking engine 40. If more than two colors are available, the mapper would separate the information into more raster patterns.

When the pixel pattern map is rasterized, mapper 77 sends page information to an output processor unit 78. The output processor unit has a page memory 79 which stores image planes for transmission to marking engine 40.

The processed image data is transmitted to multiple input controller 90. Synchronization signals to identify separate scan lines and to provide page information in marking engine control is also transmitted either from raster image processor 82 or logic and control 100 to multiple input controller 90 for transmission to the marking engine. Under the control of logic and control 100, multiple input controller can be switched between the scanner and the raster image processor for linking the appropriate input to the marking engine 40. Logic and control 100 can also provide appropriate interrupts for interrupting a job being undertaken that originated in the raster image processor in order to do a higher priority job originating in the scanner. For such sophistication, it is appropriate to have a multipage buffer located in the scanner rather than to immediately feed scanned images from CCD 19 into the job image buffer 92, as shown in FIG. 8.

The invention has been described in detail with particular reference to a preferred embodiment thereof, but it will be understood that variations and modifications can be effected within the spirit and scope of the invention as described hereinabove and as defined in the appended claims.

We claim:

1. A duplex document handler for moving each side of a document sheet in an in-track direction past a stationary scanning station, comprising:
   supply means for receiving document sheets of a large size and of a smaller size;
   means for feeding a document sheet from said supply means along a supply path, through said scanning station with a first side of the document sheet facing in a scanning orientation to scan the first side of the document sheet;
   means for feeding the document sheet, leading edge first, from said scanning station, through an inverting loop, back to said scanning station and through said scanning station, leading edge first, with a second side of the document sheet opposite the first side facing in the scanning orientation to scan the second side of the document sheet, said document sheet moving through said scanning station when scanning the second side of the document sheet, in a direction opposite the movement of the document sheet when scanning the first side, wherein said loop is of a size to receive only one large size document sheet without the leading edge of said document sheet being returned to the scanning station before the trailing edge of the document sheet leaves the scanning station, but is large enough to receive two smaller size document sheets without the leading edge of a first smaller document sheet being returned to the scanning station before the trailing edge of the second document sheet leaves the scanning station; and
   means for electronically scanning whichever side of the document sheet is facing in the scanning orientation as the document sheet moves through the scanning station.

2. A duplex document handler according to claim 1 wherein said scanning station includes reversible means for feeding the document sheet in both first and second opposite directions through the scanning station.

3. A duplex document handler according to claim 2 wherein said scanning station includes a transparent plate, a pair of feed rollers on each side of said plate and reversible means for driving said feed rollers.

4. A duplex document handler according to claim 1 wherein said scanning means includes a linear CCD array and means for projecting a moving image from said scanning station to said CCD array.

5. A duplex document handler according to claim 1 further including logic and control for feeding a second smaller document sheet to said scanning station for scanning of its first side before the first document sheet has been fed from the loop to the scanning station for exposure of its second side.

6. A duplex document handler according to claim 1 wherein said larger size document sheet has an intrack dimension approximately twice the intrack dimension of the smaller size document sheet and said handler includes logic and control responsive to an input indicating that said supply means contains duplex document sheets of said smaller size for feeding a second document sheet to said scanning station immediately after feeding of a first document sheet and for delaying the feeding of a third document sheet to provide time for scanning of both sides of the first and second document sheets.

7. A duplex document handler according to claim 6 wherein said logic and control includes means responsive to an input that large size document sheets are in said supply means for delaying feeding a second document sheet for sufficient time to permit exposure of both sides of a first document sheet Of said large size document sheets before arrival of the second document sheet at the scanning station.

8. Image forming apparatus including means for forming images one after another on receiving sheets from electronic signals containing image information, means for presenting both sides of a receiving sheet to the image forming means to form duplex images on the receiving sheets, a scanner including the duplex document handler of claim 1 and logic and control for controlling the image forming apparatus to provide duplex output corresponding to images on duplex document sheets handled by said duplex document handler.

9. A duplex document handler for moving each side of a document sheet past or through a stationary scanning station, said handler comprising:
   supply means for receiving a plurality of document sheets, said supply means including means for receiving document sheets of a large size and document sheets of a small size, smaller than the large size,
   a scanning station;
   means for feeding said document sheets, one after another, from said supply means along a supply path, through said scanning station;
   means for feeding said document sheets, leading edge first, from said scanning station through an inverting loop, and back to said scanning station for scanning of an opposite side of the document sheet, said inverting loop being of a size sufficient to permit inversion of a large size document sheet without the leading edge of the document sheet overlapping the trailing edge of the document sheet during scanning; and
   logic and control responsive to an input indicative that there are small size document sheets in said supply means for feeding a second small document sheet immediately after feeding of a first small document sheet so that both the first and second small document sheets are fed into the inverting loop prior to scanning of the opposite side of the first small document sheet.

10. A duplex document handler according to claim 9 further including electronic means for scanning a document sheet fed through said exposure station.

11. A duplex document handler according to claim 10 wherein said electronic means is a linear CCD array.

12. A duplex document handler according to claim 9 wherein said logic and control includes means for delaying the feeding of a second large size document sheet to said scanning station or a third small size document to said scanning station by enough time to permit exposure of the second side of either said first large size document sheet or said first and second small size document sheets.

13. A duplex document handler comprising:
   supply means for receiving a stack of document sheets in a face up orientation,
   first means for feeding the document sheets off the top of a received stack,
   second means for feeding a document sheet fed off the top of the stack through a single inversion to a first presentation at an exposure station, third means for feeding the document sheet though a single inversion to a second presentation at the exposure station, fourth means for feeding the document sheet through a single inversion to an output means for receiving the sheets in a face down orientation, means for moving the document sheet through the exposure station in a first direction in its first presentation and in a second opposite direction during its second presentation, and means for electronically scanning a side of the document sheet as it moves through the exposure station in both its first and second directions.

14. A duplex document handler according to claim 15 wherein the third means for feeding the document sheet includes means for feeding a document sheet, leading edge first, from the exposure station, through an inverting loop and back to the exposure station, still leading edge first.

15. A duplex document handler comprising:

supply means for receiving a stack of document sheets in a face-up orientation, which supply means can receive either large size document sheets or smaller size document sheets the smaller size document sheets being equal to or smaller than half the large size document sheet in the intrack direction, first means for feeding the document sheets off the top of a received stack in the supply means, second means for feeding a document fed sheet off the top of the stack through a single inversion to a first presentation at an exposure station, means for feeding the document sheet, leading edge first, from the exposure station, through an inverting loop, back to said exposure station, wherein said loop is of a size to receive said large size document sheet with the leading edges of document sheet not being returned to the exposure station before the trailing edge of the document sheet leaves the exposure station, fourth means for feeding the document sheet through a single inversion to an output means for receiving the sheets in a face-down orientation, means for moving the document sheet through the exposure station in a first direction in its first presentation and in a second opposite direction during its second presentation, means for electronically scanning a side of the document sheet as it moves through the exposure station in both its first and second directions, and logic and control responding to an input indicating that said supply means contains duplex document sheets of said smaller size for feeding a second document sheet to said exposure station immediately after feeding of a first document sheet and for delaying the feeding of a third document sheet to provide time for scanning of both sides of the first and second document sheets before presentation of any side of the third document sheet.

* * * * *

UNITED STATES PATENT AND TRADEMARK OFFICE
CERTIFICATE OF CORRECTION

PATENT NO. : 5,438,435
DATED : August 1, 1995
INVENTOR(S) : Gary P. Lawniczak

It is certified that error appears in the above-indentified patent and that said Letters Patent is hereby corrected as shown below:

Title page, item [56], after "Attorney, Agent, or Firm-" delete "Leonard N. Treash, Jr." and substitute ---Leonard W. Treash, Jr.---.

Column 10, line 6, delete "Of" and substitute ---of---.

Column 11, line 15, delete "15" and substitute ---13---.

Column 12, line 1, delete "fed".

Signed and Sealed this

Twenty-first Day of November, 1995

Attest:

BRUCE LEHMAN

Attesting Officer

Commissioner of Patents and Trademarks